United States Patent [19]
Banach et al.

[11] Patent Number: 5,902,873
[45] Date of Patent: May 11, 1999

[54] CATALYST COMPOSITION FOR THE PREPARATION OF POLYESTERS, AND RELATED PROCESSES

[75] Inventors: Timothy Edward Banach, Scotia, N.Y.; Francesco Pilati; Martino Colonna, both of Bologna, Italy; Maurizio Fiorini, Bazzano, Italy; Corrado Berti, Lugo, Italy; Maurizio Toselli, Monte S. Pietro, Italy; Massimo Messori, Modena, Italy; Elisabetta Marianucci, Bologna, Italy

[73] Assignee: General Electric Company, Schenectady, N.Y.

[21] Appl. No.: 08/953,455

[22] Filed: Oct. 17, 1997

[51] Int. Cl.⁶ .............................. C08G 63/78; B01J 31/00; C08K 3/02
[52] U.S. Cl. .......................... 528/279; 528/280; 528/286; 528/302; 528/308; 528/308.6; 524/706; 524/783; 524/785; 502/102; 502/150; 502/159; 502/349; 502/350
[58] Field of Search ..................................... 528/279, 280, 528/286, 302, 308, 308.6; 524/706, 783, 785; 502/102, 150, 159, 349, 350

[56] References Cited

U.S. PATENT DOCUMENTS 5,616,681  4/1997  Itoh et al. .............................. 528/279

*Primary Examiner*—Samuel A. Acquah
*Attorney, Agent, or Firm*—Noreen C. Johnson; Douglas E. Stoner

[57] ABSTRACT

A catalyst composition for use in the preparation of a polyester or copolyester is disclosed. The catalyst composition comprises the combination of (a) a titanium-based compound or zirconium-based compound, and (b) a lanthanide series compound or hafnium. Various titanium-based compounds and lanthanide-based compounds are described. Moreover, in some embodiments, the catalyst composition may further comprise a phosphate-forming compound. Another aspect of this invention is an improved method for preparing a polyester, based, for example, on the two-stage process of ester interchange and polycondensation. The method is carried out in the presence of the catalyst composition described above.

20 Claims, No Drawings

CATALYST COMPOSITION FOR THE PREPARATION OF POLYESTERS, AND RELATED PROCESSES

TECHNICAL FIELD

This invention relates generally to polymer technology. More particularly, it relates to catalysts for preparing thermoplastic polyesters.

BACKGROUND OF THE INVENTION

Thermoplastic polyesters are very important polymer materials, produced commercially in large quantities. Linear thermoplastic polyesters such as poly(butylene terephthalate) (PBT) and poly(ethylene terephthalate) (PET) are used in a variety of forms. For example, they may be used in the form of synthetic fibers, which exhibit good resistance to most mineral acids, and exhibit excellent resistance to cleaning solvents and surfactants. Thermoplastic polyesters are also used to a great extent as molding materials. Such materials are often highly crystalline, and are characterized by many desirable properties, such as hardness, strength, toughness, good chemical resistance, and low moisture absorption.

On a commercial scale, thermoplastic polyesters are usually produced in a two-stage polymerization process. The first stage is often referred to as "pre-condensation" or "ester interchange". It involves oligomer formation by ester interchange of dimethyl terephthalate (DMT) with a dihydroxy compound, such as a glycol. Alternatively, the first stage can involve esterification of an aromatic acid such as terephthalic acid with a dihydroxy compound.

The second stage is often referred to as "polycondensation". In this stage, the oligomer formed in the first stage is polymerized at elevated temperatures, as excess glycol is removed. The overall reaction can be carried out as a batch process, but is typically a continuous operation, using two or more reactors.

Titanium-based compounds such as tetra-n-butyl titanate or tetraisopropyl titanate are often used to catalyze the reactions described above. As described in U.S. Pat. No. 5,519,108, for example, PBT can be prepared by reacting DMT and 1,4-butanediol at about 220° C. to about 260° C., using the titanium catalyst to initiate and accelerate the ester interchange reaction.

The presence of an effective catalyst is critical to the manufacturing process, especially in large scale operations where high yields and rapid processing times are required for economic production. The organotitanate compounds are effective to some degree in the production of polyesters like PBT. However, the rate of transesterification in the presence of such catalysts is relatively slow. Thus, long residence times are sometimes required to produce high molecular weight resins on an industrial scale. Furthermore, higher reaction temperatures may be required, thereby producing undesirable carboxylic acid end groups on the polymer product being formed. The presence of these types of end groups wastes the diol-type component, e.g., the butanediol, via conversion to unrecoverable side products such as tetrahydrofuran (THF).

The ultimate effects of using a relatively slow catalyst in polyester production are lower reactor capacity, lower productivity, and higher production costs. Thus, any improvement in the catalyst should result in higher reactivity which will, in turn, eliminate or minimize the undesirable effects described above.

Alternative catalyst systems for the production of polyesters like PBT have been described in the prior art. For example, U.S. Pat. No. 5,519,108 (Yuo et al) describes the use of a titanium compound as a primary catalyst, along with a cocatalyst system which includes a combination of at least one compound based on Zn, Co, Mn, Mg, Ca, or Pb, with various phosphite- or phosphate-based compounds. Another example is provided in an article entitled PET Synthesis in the Presence of Lanthanide Catalysts (J. Appl. Poly. Sci., 1995, Vol. 58, pp. 771–777). In that article, V. Ignatov et al. describe the use of various lanthanide catalysts in the production of PET.

Despite some of the advances described above, there continues to be a need for new catalysts or catalyst systems for preparing thermoplastic polyesters like PET and PBT. The new catalysts should provide high reactivity during preparation of the polymer products. Moreover, use of the catalysts should not lead to an excessive level of undesirable reaction byproducts. The new catalysts should also be relatively economical to use. Finally, polyester products formed by polymerization processes employing the new catalysts should have substantially the same property profiles as products based on the use of conventional catalysts.

SUMMARY OF THE INVENTION

The present invention satisfies the needs discussed above. One embodiment is directed to a catalyst composition for use in the preparation of a polyester or copolyester, comprising the combination of (a) a titanium-based compound or zirconium-based compound, and (b) a lanthanide series compound or hafnium.

The molar ratio of the catalyst element of component (a) to the catalyst element of component (b) is usually in the range of about 90:10 to about 10:90. Various titanium-based compounds and lanthanide-based compounds are described below. Moreover, in some embodiments, the catalyst composition may further comprise a phosphate-forming compound.

Use of the catalyst systems provided by the present invention results in high reactivity during the preparation of polyesters like PBT. Moreover, the formation of undesirable side products is reduced, while the quality of the final product is equal to or better than polyesters prepared using catalysts of the prior art.

Another aspect of this invention is an improved method for preparing a polyester, based, for example, on the two-stage process of ester interchange and polycondensation. The method is carried out in the presence of the unique catalyst composition discovered by the present inventors. Numerous other details regarding these embodiments are provided below.

DETAILED DESCRIPTION OF THE INVENTION

Component (a) of the catalyst composition of this invention is a titanium-based compound or zirconium-based compound. Many suitable compounds of each type are known in the art. Some of them have the formulae $Ti(OR)_4$ or $MgTi(OR)_6$, where R is any alkyl radical. Non-limiting examples of the tetravalent titanium-based compounds are tetraethyl titanate, tetra-n-propyl titanate, tetraisopropyl titanate, tetra-n-butyl titanate, tetra-(2-ethylhexyl) titanate, titanium diisopropoxide bis(acetylacetonate), titanium oxide acetylacetonate and water-stable titanium compounds, e.g., those which include considerable alcohol-type residues, like titanium (triethanolaminato)isopropoxide. In some preferred embodiments, the titanium compound is of the $Ti(OR)_4$ type, e.g., tetra-n-butyl titanate.

Some of the tetravalent zirconium-based compounds conform to the formula $Zr(OR)_4$, where R is any alkyl radical, e.g., tetra-n-butyl zirconate. Non-limiting examples of suitable zirconium-based compounds are zirconium acetate, zirconium acetylacetonate, zirconium n-butoxide, zirconium t-butoxide, zirconium ethoxide, zirconium isopropoxide isopropanol complex, zirconium propoxide and zirconium trifluoroacetylacetonate.

All of the titanium and zirconium compounds useful for the present invention are available commercially, and/or can be readily synthesized by those of ordinary skill in the area of chemical synthesis. As an example, many details regarding relevant titanium compounds are provided in the *Kirk-Othmer Encyclopedia of Chemical Technology*, 3rd Edition, Vol. 23, (1983), pp. 131–244, and the *Aldrich Catalogue—Handbook of Fine Chemicals*, 1996–1997. Many of the compounds are supplied in the form of a solution. Titanium-based compounds are often preferred for component (a).

The second component of the catalyst composition [i.e., component (b)] is a lanthanide series compound or hafnium. Lanthanide compounds suitable for this invention are known in the art. They are part of the family known as "rare earth elements", as described in the *Kirk-Othmer Encyclopedia of Chemical Technology*, 3rd Edition, Vol. 19, (1982), pp. 833–854. More specifically, elements with atomic numbers of 58–71 are generally said to have properties characteristic of lanthanum, and they are referred to as "lanthanide rare earths" or simply "lanthanides".

Lanthanide catalysts suitable for this invention are often used in the form of complexes (as in the case of most metal catalysts). Many of these complexes are described in the V. Ignatov et al. article mentioned above. Non-limiting examples include lanthanide acetylacetonate complexes (which could include dipyridyl ligands); $Sm(L)_3$ and $Eu(L)_3$, where L is salicylaldehyde; europium 2,2'-dipyridyl tris (acetylacetonate), europium phenoxide tris (acetylacetonate), cerium triacetate, terbium 2,2'-dipyridyl tris(acetylacetonate), erbium tris(nitrate)-benzo-12-crown-4, samarium triacetate, samarium tris(acetylacetonate) and lanthanum triacetate. Many of these compounds are available as hydrates.

In preferred embodiments, the lanthanide series compound is one based on an element selected from the group consisting of lanthanum, samarium, europium, erbium, terbium and cerium. In especially preferred embodiments, the lanthanide compound is one based on an element selected from the group consisting of terbium, erbium and lanthanum.

In some embodiments, hafnium-based compounds are preferred for component (b) of the catalyst composition. Usually, these compounds are also in the form of a complex. Non-limiting examples include hafnium tetrakis (acetylacetonate); as well as hafnium alkoxides such as hafnium tetraethoxide, hafnium tetrabutoxide, hafnium tetrapropoxide, hafnium tetrakis(isopropoxide), and hafnium tetrakis(2-ethylhexoxide). In some preferred embodiments, the hafnium compound is hafnium tetrakis (acetylacetonate). Many of these materials are available commercially (e.g., see the *Aldrich Catalogue* mentioned above), or can be readily synthesized.

The ratio of component (a) to component (b) (i.e., titanium/zirconium compound to lanthanide/hafnium compound) may vary considerably, and will depend on a variety of factors, such as the chemical activity of the particular catalyst, the particular monomers being used, and the reaction profile employed, e.g., the number of reactors, temperature regimen, pressure conditions, residence time, and the like. In general, the molar ratio of component (a) to component (b) will be from about 90:10 to about 10:90. In preferred embodiments, the molar ratio will be from about 75:25 to about 25:75.

The preferred ratio of catalyst components for a particular reaction system can be determined by experiment, e.g., by measuring the average polymerization degree on a small scale, as described in the examples. In some particularly preferred embodiments directed to the use of a titanium-lanthanum-based catalyst composition, at least about 65% of the total molar content of catalyst elements comprises titanium. In some particularly preferred embodiments directed to the use of a titanium-hafnium-based catalyst composition, at least about 65% of the total molar content of catalyst elements comprises hafnium.

In some embodiments of the present invention, the catalyst composition further comprises a phosphate-forming compound, i.e., any compound which chemically or physically converts (e.g., via oxidation) to a phosphate-containing molecule during any stage of the polyester formation process. In some reaction systems, the addition of the phosphate appears to further increase reactivity. Exemplary classes of such compounds include alkali metal phosphates, alkali metal phosphites, alkali hypophosphites, and alkali metal polyphosphates. Some of these compounds are described in the previously mentioned U.S. Pat. No. 5,519,108.

Non-limiting, specific examples include sodium dihydrogen phosphate, trisodium phosphate, disodium hydrogen phosphate, disodium hydrogen phosphite, and sodium dihydrogen phosphite. The alkali metal hypophosphite can be a hypophosphite salt containing any number of alkali metal groups. The alkali metal polyphosphate can be a polyphosphate salt containing one, two, three, four or five alkali metal groups. Moreover, other alkali metals (e.g., potassium or lithium) could be used in place of sodium for many of these compounds. In some preferred embodiments, sodium dihydrogen phosphate is the preferred phosphate-forming compound.

The most appropriate amount of phosphate-forming compound employed will depend on various factors, such as the identity of components (a) and (b), the ratio of component (a) to component (b), and the overall molar concentration of catalyst employed. When used, the phosphate compound will typically be present at a level of about 10% by weight to about 85% by weight, based on the combined weights of phosphorus and the catalyst elements of component (a) and component (b). In more preferred embodiments, the phosphate compound will be present at a level of about 25% by weight to about 75% by weight.

The phosphate-forming compound and components (a) and (b) can be premixed in solution, or in some instances, can be added separately (or in various combinations) to the reaction system. Some discussion regarding the addition of the catalyst composition during formation of the polyester can be found below.

A very wide variety of thermoplastic polyesters may be prepared with the catalyst composition of the present invention. As used herein, the term "polyesters" is meant to include both homopolymers and copolymers, as well as polymer mixtures which comprise at least about 50% by weight polyester. Most of the polyesters which are useful in this invention are based on the reaction of dihydroxy compounds with dicarboxylic acids or their esters or ester-forming derivatives. Instructive information regarding polyesters can be found in many references, such as *Organic Polymer Chemistry*, by K. J. Saunders, 1973, Chapman and Hall Ltd; the *Kirk-Othmer Encyclopedia of Chemical Technology*, 3rd Edition, Vol. 18; and U.S. Pat. Nos. 5,519,108; 5,496,887; 4,732,921; 4,485,212; 4,369,280; 4,292,233; 4,280,949; 4,257,937; 4,211,689; 3,047,539; and 2,465,319. While many of the polyesters of interest are linear, branched polyesters may also be used.

The dihydroxy compounds may be aliphatic, aromatic or alicyclic diols, for example. Non-limiting examples include ethylene glycol (ethanediol), 1,3-propanediol, 1,4-butanediol, cyclohexanediols (e.g., 1,4-cyclohexanedimethanol), hydroquinone, resorcinol, bisphenol A, and "dimer diols" (e.g., 2,2,4,4-tetramethyl-1,3-cyclobutanediol). Mixtures of diols may also be used. The diols mentioned above may contain up to about 10 mole percent of the residues of a variety of additional diols, such as alkyl-substituted diols (e.g., neopentyl glycols, various alkylpropanediols, alkylpentanediols, alkylhexanediols and the like).

The dicarboxylic acids which can be used for this invention may be aliphatic or aromatic, or may be based on mixtures of aliphatic and aromatic compounds. Non-limiting examples include isophthalic acid, terephthalic acid, alkyl-substituted derivatives of any of the above-mentioned acids, naphthalenedicarboxylic acids, and aliphatic dicarboxylic acids such as succinic acid, adipic acid, sebacic acid, azelaic acid, and decanedicarboxylic acid. Examples of esters which may be used in the preparation of the polymer are the alkyl-based esters, such as DMT. As in the case of the diols, more than one dicarboxylic acid (or ester or ester-forming derivative) may be used in the polymerization reaction.

Moreover, the term "thermoplastic polyester" as used herein is meant to include polyesters which are mixed with other polymeric materials, such as ethylene-ethyl acrylate copolymers, ethylene-vinyl acetate copolymers and rubber-type polymers. The particular content of the polyester composition will of course depend on the properties required for the final product, e.g., properties such as toughness and impact resistance. Those of ordinary skill in the art understand that some of these materials may be compounded with the polyester after it has been made, while other materials may be incorporated into the polyester during its polymerization.

In some preferred embodiments, the polyester or copolyester is a poly(alkylene terephthalate), such as poly(butylene terephthalate), poly(ethylene terephthalate), copolymers of poly(butylene terephthalate) and copolymers of poly(ethylene terephthalate). These types of materials, most of which are crystalline, are described in many of the references set forth above. They often have a molecular weight sufficient to provide an intrinsic viscosity in the range of about 0.4 dl/g to about 1.25 dl/g, as measured at 30° C. in phenol/tetrachloroethane (60:40 by weight).

The poly(butylene terephthalate) polymers and copolymers are often preferred for certain embodiments, e.g., when the materials are to be used with reinforcing agents; or when low temperature processing (e.g., molding) of the materials is to be undertaken.

Various techniques are available for preparing polyesters. As mentioned above, commercial materials are often produced in a two-stage polymerization process: ester interchange and polycondensation. Although polyester materials could be produced by a batch process, they are more often made by a continuous process, using a series of reactors, e.g., 2 to 6 reactors, followed by at least one finishing reactor. Often, the series reactors are of the CSTR-type, as described, for example, in the *Kirk-Othmer Encyclopedia of Chemical Technology*, 3rd Edition, Vol. 19, (1982.). (The level of agitation, i.e., stirring, in each reactor may vary considerably). The reactors can operate under a sequential regimen of increasing temperature and decreasing pressure. Typically, reaction temperature will range from about 160–260° C., and more often about 185–245° C. The pressure in each reactor will usually be in the range of about 1200 mbar to about 10 mbar.

Usually, the ester interchange reaction will be carried out in the first reactor, or in the first two or three reactors. These initial "oligomeric stages" remove about 80% to about 99% of the volatile byproducts, of which methanol and butanediol are the largest constituents. Sometimes, the distinction between the ester interchange stage and the polycondensation stage is not entirely clear. However, for the purpose of this discussion, the ester interchange stage is said to be substantially complete when at least about 99% of the theoretical amount of methanol has been taken out of the reaction system.

The level of catalyst used will depend on many factors, such as the identity of the individual catalyst components, the monomers being employed, the type of reactors being used, and other reaction parameters. In some preferred embodiments, the catalyst composition will be present at a level of about 25 ppm to about 500 ppm catalyst (i.e., total catalyst) based on dicarboxylic acid, corresponding ester, or ester-forming derivative used (total). In preferred embodiments, the range will be from about 50 ppm to about 300 ppm catalyst, while in some especially preferred embodiments, the range will be from about 75 ppm to about 200 ppm catalyst. However, those skilled in industrial chemistry and chemical engineering will be able to determine the most appropriate catalyst level for a given situation without undue effort, based on the teachings herein.

As mentioned above and further described in the following examples, the catalyst composition of the present invention can be added to the reaction system at various stages. As an illustration for a continuous reaction process, all of the catalyst could be added to the first reactor of a series of reactors. Alternatively, the titanium- or zirconium-based component (a) could be added to the first reactor, e.g., at the beginning of ester interchange, while the second catalyst component [i.e., hafnium or the lanthanide of component (b)] could be added in one of the reactors downstream, e.g., to the reactor which will be the site of the beginning of polycondensation. In one variation, component (b) could be added at the beginning of ester interchange, while component (a) could be added to one of the downstream reactors. As still another alternative, a portion of component (a) could be added in the first reactor along with a portion of component (b), while the remaining portions could be added simultaneously or independently to one or more of the other reactors. When the phosphate-forming compound is used, it may also be added during any stage of the reaction.

In some preferred embodiments, all of the catalyst composition (including the optional phosphate-forming compound) is added during the ester interchange stage, and more preferably, at the beginning of this stage. Addition of the catalyst composition at this early point can help to prevent decomposition of the molten polymer being formed.

Those skilled in chemical engineering understand that a wide variety of reactor configurations and designs are sometimes employed, and selection of a particular system depends on many factors, such as the specific types of reactants and catalysts employed, the volume of product being prepared, energy requirements, environmental parameters, the desired molecular weight of the polyester product, and its viscosity. On an industrial scale, the continuous reaction process usually concludes with the use of one or more finishing reactors. They are often plug flow reactors, which are particularly useful for treating high viscosity melt materials. Other details regarding product recovery, isolation, and compounding are generally well known in the art.

It should be understood that another aspect of this invention is directed to a process for preparing a thermoplastic polyester by reaction of at least one dihydroxy compound with at least one dicarboxylic acid, corresponding ester, or ester-forming derivative, wherein the process is carried out in the presence of a catalyst composition which comprises the combination of:

(a) a titanium-based compound or zirconium-based compound, and (b) a lanthanide series compound or hafnium. In preferred embodiments, the catalyst composition further comprises a phosphate-forming compound.

Other details regarding the process are set forth above, as well as in the following examples. These examples are merely illustrative, and should not be construed to be any sort of limitation on the scope of the claimed invention. The following abbreviations are used hereinafter:

BDO=1,4-butanediol;

THF=tetrahydrofuran;

MeOH=methanol;

BHBT=an oligomer based on one terephthalate unit and two butanediol units;

DMT=dimethyl terephthalate;

PBT=poly(butylene terephthalate);

Ti=titanium tetrabutoxide (sometimes referred to herein as a "titanate").

When each of the following elements is listed as the catalyst, it is actually being used in the form of a compound as follows: Ti=titanium tetra-n-butoxide, Hf=hafnium tetrakis(acetylacetonate), Sm=samarium tris (acetylacetonate), Er=erbium tris(acetylacetonate), Tb=terbium tris(acetylacetonate), La=lanthanum tris (acetylacetonate), Eu=europium tris(acetylacetonate).

EXAMPLE 1

In this example, the ineffectiveness of hafnium and various lanthanide series catalysts for the preparation of a linear polyester like poly(butylene terephthalate) is demonstrated. A titanium-based catalyst is used for comparison.

PBT was prepared in a variety of reactions, each using a catalyst system outside the scope of the present invention. The catalysts are listed in the first column of Table I. In each instance, the reaction was carried out in two stages: an ester interchange stage and a polycondensation stage. The details are provided in Example 6 below.

In Table I, the "1st stage" is the ester interchange step, while the "2nd stage" is the polycondensation step. The "1st stage duration" indicates the amount of time required for 95% conversion to the intermediate product, i.e., low molecular weight oligomers, based on measurement of methanol output, i.e., measurement of the "1st stage volatiles". As an illustration, when using the titanium catalyst (tetra-n-butyl titanate, first run), "293 ml" represented 95% conversion to volatiles including methanol. That point approximately marked the end of the 1st stage and the beginning of the 2nd stage.

THF is a by-product of PBT synthesis. The 5.8% of THF for the titanium catalyst (1st run) is thus an indication that 5.8% of the 1st stage volatile content was THF. In general, the higher the THF level, the lower the effectiveness of the catalyst. The "2nd stage duration" represents the time required for the polycondensation reaction to occur. The time value is based on a viscosity measurement. The associated volatile content for this stage is also provided in Table I, along with the level of THF produced in this stage of the reaction.

Table I also includes a value for the total amount of THF produced during the reaction, along with the relative amount of butanediol (BDO) converted to THF. Finally, Table I includes the total amount of methanol produced during the reaction.

TABLE I

Polymerization of PBT, Comparing Titanium with Lanthanide Catalysts

| Catalyst | 1$^{st}$ Stage duration (min) | 1$^{st}$ Stage volatiles (mL) | % THF 1$^{st}$ Stage | 2$^{nd}$ Stage duration (min) | 2$^{nd}$ Stage volatiles (mL) | % THF 2nd Stage | Overall THF (mol) (1$^{st}$ + 2$^{nd}$) | % BDO => THF | MeOH yield$^a$ |
|---|---|---|---|---|---|---|---|---|---|
| Ti* (1st run) | 140 | 293 | 5.8 | 140 | 46 | 55 | 0.61 (0.21 + 0.40) | 11.9 | 98.6 |
| Ti*) (2nd run) | 170 | 292 | 6.4 | 135 | 52 | 39 | 0.59 (0.23 + 0.36) | 11.6 | 99.0 |
| Sm* | 143 | 291.5 | 11.8 | 160 | 72 | 60 | 1.15 (0.42 + 0.73) | 22.6 | 94.3 |
| Sm* (2nd run) | 180 | 291 | 16.0 | 200 | 49 | 45 | 0.95 (0.57 + 0.38) | 18.7 | 89.5 |
| Hf | 210 | 293 | 23.1 | 150 | 74 | 44 | 1.39 (0.83 + 0.56) | 27.3 | 86.4 |
| Er | 165 | 292 | 12.4 | 140 | 51 | 56 | 0.90 (0.45 + 0.45) | 17.6 | 92.0 |
| Tb | 146 | 292 | 10.6 | 195 | 53 | 65 | 0.90 (0.38 + 0.52) | 17.7 | 92.7 |
| La | 230 | 290 | 27.4 | 190 | 64 | 45 | 1.26 (0.77 + 0.49) | 24.6 | 85.8 |
| Eu | 140 | 274 | 12.6 | 240 | 23 | 29 | 0.50 (0.37 + 0.13) | 9.9 | 87.2 |

$^a$Overall methanol yield.
*1st stage reaction inadvertently run 10° C. higher than for the rest of the runs.

The data of Table I demonstrate that, when used individually, neither hafnium nor any of the other lanthanide elements is as effective a catalyst for PBT as the titanium-based catalyst. One indication of the lack of effectiveness of these catalysts is the relatively low level of methanol yield. In order for most industrial-scale reactions of this type to be effective, the methanol yield should be as close to 100% as possible—certainly well above 95%.

Further indication of the inferiority of the most of the hafnium/lanthanide series catalysts for this type of reaction is provided by the relative duration of the reaction stages. For example, the first stage duration values for the elemental catalysts Hf and La are far higher than that for Ti (1st run). The same can be said for the second stage duration values, e.g., for Sm, Tb, La, and Eu.

To further demonstrate the ineffectiveness of these catalysts, it should be noted that their use resulted in practically no observed increase in the viscosity of the reaction mixture. In other words, there was no increase in molecular weight which would indicate that polymer was being formed in the second stage of the reaction.

Moreover, the use of hafnium and many of the lanthanide series catalysts results in an unacceptably high level of by-product formation, e.g., THF formation. The conversion of BDO to THF can be a serious problem in commercial production, since the BDO (often a costly raw material) is wasted in such a side reaction.

EXAMPLE 2

In this example, the reactivity of titanium, hafnium and the lanthanide series catalysts was evaluated for a simplified one-stage polymerization of a linear polyester-type oligomer. In a series of runs, 2 g of BHBT was placed in an evacuated tube at 234° C. for the time periods listed in Table II. Each of the catalysts listed in the table was added to a different sample of the BHBT, at a catalyst loading level of 3.1 mmol/l. The degree of polymerization was determined by proton-NMR measurements. At least two runs were carried out for each catalyst sample, and the results were averaged.

TABLE II

Comparative Reactivity of Terephthalate/Butanediol Oligomers, Using Single Catalysts

| Catalyst | Average Polymerization Degree | |
|---|---|---|
| | 3 min. | 40 min. |
| Ti | 2.7 | 10.7 |
| Hf | 1.2 | 2.4 |
| Tb | 1.2 | 1.6 |
| Sm | 1.3 | 1.6 |
| La | 1.2 | 2.2 |
| Er | 1.2 | 2.2 |

These results demonstrate almost no reactivity when using hafnium and the lanthanide catalysts. In contrast, the comparative catalyst, titanium tetra-n-butoxide, was considerably active in inducing polymerization.

EXAMPLE 3

In this example, the reactivity of mixed catalyst compositions of the present invention was evaluated. The reactivity for the titanium catalyst by itself was also evaluated. The one-stage polymerization system of Example 2 was also employed here, according to the same parameters except that the time was 50 minutes. Each catalyst combination was mixed on a 1:1 molar base with the titanate catalyst, at a (total) catalyst loading level of 3.1 mmoles per liter. The degree of polymerization was measured as in Example 2. The results are shown in Table III.

TABLE III

Comparative Reactivity of Terephthalate/Butanediol Oligomers - Mixed Catalysts

| Catalyst Composition | Average Polymerization Degree |
|---|---|
| Ti—Hf | 18.4 |
| Ti—Tb | 17.0 |
| Ti—Er | 14.4 |
| Ti—La | 12.5 |
| Ti* | 6.2 |
| Ti—Sm | 5.5 |
| Ti—Ce | 5.1 |
| Ti—Eu | 5.0 |

*Single catalyst used here, i.e., only the titanate compound.

Table III demonstrates surprisingly high reactivity for the Ti—Hf, Ti—Tb, Ti—Er, and Ti—La catalyst compositions, as compared to using Ti by itself. Moreover, the reactivity of the other catalyst combinations, Ti—Sm, Ti—Ce, and Ti—Eu, although not as high as the first group, was still considerably higher than the reactivities (at 40 minutes) for the individual lanthanide-type catalysts shown in Table II.

EXAMPLE 4

In this example, the reactivity of mixed catalysts according to the present invention was again investigated, using various ratios for the individual catalyst elements. As in Examples 2 and 3, a one-stage polymerization for a BDO/DMT-based polyester oligomer was employed here under the same conditions as in Example 2, except that the reaction time was 25 minutes as the starting oligomer had a higher initial degree of polymerization. The degree of polymerization was measured as in Example 2. The results are shown in Table IV.

TABLE IV

Comparative Reactivity of Terephthalate/Butanediol Oligomers - Mixed Catalysts; Varying Catalyst Ratios*

| Catalyst Composition | Titanium/co-catalyst molar ratio | | |
|---|---|---|---|
| | 1:2 M/M** | 1:1 M/M | 2:1 M/M |
| Ti—La | 11.3 | 16.2 | 19.3 |
| Ti—Hf | 19.1 | 14.6 | 14.5 |
| Ti—Er | 10.4 | 13.4 | 13.1 |

*Polymerization at 234° C.
**Mole/Mole ratio.

The data of Table IV demonstrate that the reactivity of some of the catalyst systems described in Example 3 can be further enhanced by varying the individual catalyst ratios. The reactivity of the Ti—La system was improved by increasing the proportion of titanate. In contrast, the reactivity of the Ti—Hf system was improved by increasing the proportion of the "non-titanate" component, i.e., hafnium. Thus, there is some unpredictability as to reactivity when progressing from one catalyst system to another.

EXAMPLE 5

This example demonstrates the use of catalyst compositions of the present invention in the preparation of PBT according to a 2-stage, conventional process, using DMT and BDO as the raw materials. In the case of the mixed catalyst composition, the molar ratio of Ti to Hf was 1:3. The polymerization process was identical to that used for Examples 6–8.

The results are shown in Table V.

TABLE V

Comparative Reactivity to Form PBT, Using Mixed Catalysts

| Catalyst Composition | Polymerization Duration (min) | Total Volatiles (ml) | Mol % BDO to THF |
|---|---|---|---|
| Ti | 280 | 343 | 11.2 |
| Ti in 1st stage, Hf in 2nd stage | 180 | 318 | 8.8 |
| Ti + Hf from beginning | 160 | 332 | 9.3 |

The results shown in Table V demonstrate the effectiveness of one exemplary catalyst composition of the present invention. The mixed catalyst composition was significantly better in performance, as compared to the use of the titanate catalyst alone. This was the case in those instances in which the hafnium-based component was added in the second stage of the reaction, as well as when the hafnium was added to the reaction system with the titanate component at the beginning of the first stage of the reaction.

EXAMPLE 6

This example demonstrates the preparation of PBT, using a conventional titanate catalyst system. 705 g of DMT and 458 g of BDO were mixed in a stainless steel reactor equipped with a paddle stirrer while heating. When the temperature of the mixture reached about 150° C., 1 g of titanium tetra-n-butoxide (that is 0.14 phr with respect to DMT), dissolved in a small amount of BD O, was injected into the mixture. Within a few minutes, methanol began distilling off from a column connected to the top of the reactor. The temperature of the mixture was slowly increased up to 215° C. while methanol continued distilling off. When the ester interchange reaction, as judged from the amount of methanol distilled off, was about 95% complete, the column was closed. A vacuum line was then connected to the reactor, and the internal pressure was slowly decreased to 1.5 mbar. The temperature of the reactor was increased to 245° C. After 110 min, the polycondensation reaction was complete (as judged by the torque required to stir the melt) and PBT was taken out from a valve at the bottom of the reactor. The intrinsic viscosity of the PBT prepared by this procedure was 0.97 di/g.

EXAMPLE 7

Example 6 was repeated, using the same apparatus. For this example, the ester interchange reaction was carried out in the presence of 0.08 phr of titanium tetra-n-butoxide. Immediately prior to the beginning of the polycondensation stage, 0.14 phr of hafnium tetrakis(acetylacetonate) was added. The duration of the polycondensation stage was reduced to 60 min with an internal pressure of 1.8 mbar. The intrinsic viscosity of the PBT sample prepared in this example was 0.86 dl/g.

EXAMPLE 8

Example 6 was again repeated. In this variation, 0.08 phr of titanium tetrabutoxide and 0.14 phr of hafnium tetrakis (acetylacetonate) were both introduced in the reactor at the beginning of the ester interchange stage. The duration of this stage was reduced to 100 min. The second stage was carried out for 60 min, with an internal pressure of 1.8 mbar. The intrinsic viscosity of the PBT sample prepared in this example was 0.96 dl/g.

EXAMPLE 9

In this example, the reactivity of a phosphate-containing catalyst composition was evaluated in a one-stage polymerization reaction like that used in Example 2. 1 g of BHBT was placed in a sealed tube at 234° C. for 30 minutes. Each of the catalyst compositions listed in the table was added to a different sample of the BHBT, at a catalyst loading level of 3.1 mmol/l. The degree of polymerization was determined by proton NMR measurements. At least two runs were carried out for each catalyst sample, and the results were averaged. Table VI provides the relevant summary.

TABLE VI

Comparative Reactivity to Form PBT, Using Various Catalyst Compositions

| Catalyst Composition | Average Polymerization Degree |
|---|---|
| Ti* | 10.7 |
| Ti—Hf** | 19.5 |
| Ti—Hf—PO$_4$*** | 31.3 |

*Comparative catalyst
**Molar ratio for Ti:Hf of 1:2.
****Molar ratio for Ti:Hf:PO$_4$ of 1:2:3.3; "PO$_4$" = NaH$_2$PO$_4$ These results demonstrate increased reactivity for the mixture of titanium and hafnium, as compared to titanium alone. Moreover, the use of the titanium/hafnium/phosphate composition resulted in an extremely large increase in reactivity. The increase in that instance represents a high molecular weight, i.e., beyond the detection limit of the NMR system.

EXAMPLE 10

This example involves the preparation of PBT according to the procedure described in Example 6. A variety of catalyst systems were employed, some of which included a phosphate component. The data in Table VII resulted from the experiment.

TABLE VII

Polymerization of PBT, Comparing Variety of Catalyst

| Catalyst | 1st Stage duration (min) | 1st Stage volatiles (mL) | [COOH] Stage kg | 2nd Stage duration (min)*** | 2nd Stage volatiles (mL)** | % THF 2nd Stage (vol) | Overall THF % by vol. | % BDO => THF (mole) | I.V. (dl/g) |
|---|---|---|---|---|---|---|---|---|---|
| Ti[a] | 143 | 292 | 44 | 110 | 52 | 56 | 6.4 | 1.3 | 1.01 |
| Ti—PO$_4$ | 55 | 265 | 61 | 85 | 56 | 62 | 0.7 | 4.3 | 1.13 |
| Ti—Hf | 90 | 275 | 25 | 50 | 62 | 29 | 4.2 | 8.8 | 0.98 |
| Ti—Hf—PO$_4$ | 45 | 278 | 42 | 80 | 50 | 46 | 2.0 | 6.8 | 1.03S |

*Molar ratio of Ti to PO$_4$ = 1.2:1; molar ratio of Ti to Hf = 1:2; molar ratio of Ti to Hf to PO$_4$ = 1:2:2.5.
**Second condenser liquid nitrogen-cooled.
***Taken from the end of pressure decrease from atmospheric pressure.
[a]Comparative sample.

The intrinsic viscosity values demonstrate that the mixed phosphate catalyst samples are capable of preparing polymer product of considerable molecular weight. While the characteristics for each reaction varied to some extent, several specific findings are significant. First, the use of the phosphate component reduced the amount of by-product formation (BDO→THF) that occurred in the case of both the Ti— and Ti—Hf-type catalyst systems. There was also a considerable decrease in the 1st stage duration for the systems in which the phosphate component was included, although the results for the 2nd stage duration were not as conclusive.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

All of the patents, articles, and texts mentioned above are incorporated herein by reference.

What is claimed is:

1. A catalyst composition for use in the preparation of a polyester or copolyester, comprising the combination of
   (a) a titanium-based compound or zirconium-based compound, and
   (b) a lanthanide series compound or hafnium based compound; wherein the molar ratio of the catalyst element of component (a) to the catalyst element of component (b) is in the range of about 90:10 to about 10:90.

2. The catalyst composition of claim 1, wherein the molar ratio is in the range of about 75:25 to about 25:75.

3. The catalyst composition of claim 1, wherein the titanium-based compound is selected from the group consisting of tetraethyl titanate, tetra-n-propyl titanate, tetraisopropyl titanate, tetra-n-butyl titanate, tetra-(2-ethylhexyl) titanate, titanium diisopropoxide bis(acetylacetonate), titanium oxide acetylacetonate and water-stable titanium compounds.

4. The catalyst composition of claim 1, wherein the lanthanide series compound is based on an element selected from the group consisting of lanthanum, samarium, europium, erbium, terbium and cerium.

5. The catalyst composition of claim 1, wherein the lanthanide series compound is based on an element selected from the group consisting of terbium, erbium and lanthanum.

6. The catalyst composition of claim 1, wherein the lanthanide series compound is selected from the group consisting of lanthanide acetylacetonate complexes, Sm(L)$_3$ and Eu(L)$_3$, where L is salicylaldehyde; europium 2,2'-dipyridyl tris(acetylacetonate), europium phenoxide tris(acetylacetonate), cerium triacetate, terbium 2,2'-dipyridyl tris(acetylacetonate), erbium tris(nitrate)-benzo-12-crown-4, samarium triacetate, samarium tris(acetylacetonate) and lanthanum triacetate.

7. The catalyst composition of claim 1, wherein the hafnium-based compound is selected from the group consisting of hafnium tetrakis(acetylacetonate) and hafnium alkoxides.

8. The catalyst composition of claim 1, further comprising a phosphate-forming compound.

9. The catalyst composition of claim 8, wherein the phosphate-forming compound is selected from the group consisting of alkali metal phosphates, alkali metal phosphites, alkali hypophosphites and alkali metal polyphosphates.

10. The catalyst composition of claim 8, wherein the phosphate-forming compound is selected from the group consisting of sodium dihydrogen phosphate, trisodium phosphate, disodium hydrogen phosphate, disodium hydrogen phosphite and sodium dihydrogen phosphite.

11. The catalyst composition of claim 8, wherein the phosphate-forming compound is present at a level of about 10% by weight to about 85% by weight, based on the combined weight of phosphorus and the catalyst elements of component (a) and component (b).

12. The catalyst composition of claim 1, wherein the polyester or copolyester is selected from the group consisting of poly(butylene terephthalate), poly(ethylene terephthalate), copolymers of poly(butylene terephthalate) and copolymers of poly(ethylene terephthalate).

13. A process for preparing a thermoplastic polyester by reaction of at least one dihydroxy compound with at least one dicarboxylic acid, corresponding ester, or ester-forming derivative, wherein the process is carried out in the presence of a catalyst composition which comprises the combination of
   (a) a titanium-based compound or zirconium-based compound, and
   (b) a lanthanide series compound or hafnium based compound; wherein the molar ratio of the catalyst element of component (a) to the catalyst element of component (b) is in the range of about 90:10 to about 10:90.

14. The process of claim 13, wherein the catalyst composition further comprises a phosphate-forming compound.

15. A process for preparing a thermoplastic polyester which comprises forming a precursor oligomer by ester interchange of at least one dihydroxy compound with at least one dicarboxylic acid, corresponding ester, or ester-forming derivative to form the precursor oligomer, and then subjecting the precursor oligomer to polycondensation to form the polyester, wherein the process is carried out in the presence of a catalyst composition which comprises the combination of
  (a) a titanium-based compound or zirconium-based compound, and
  (b) a lanthanide series compound or hafnium based compound; wherein the molar ratio of the catalyst element of component (a) to the catalyst element of component (b) is in the range of about 90:10 to about 10:90.

16. The process of claim 15, wherein the catalyst composition is present at a level of between about 25 ppm to about 500 ppm total catalyst based on dicarboxylic acid, corresponding ester, or ester-forming derivative.

17. The process of claim 15, wherein the catalyst composition further comprises a phosphate-forming compound.

18. The process of claim 15, wherein the dihydroxy compound is 1,4-butanediol, and the polyester is poly (butylene terephthalate).

19. The process of claim 15, wherein substantially all of component (a) is present during the ester interchange step, and substantially all of component (b) is added during the polycondensation step.

20. The process of claim 15, wherein substantially all of the catalyst composition is present during the ester interchange step.

* * * * *